US011476473B2

(12) United States Patent
Homma et al.

(10) Patent No.: US 11,476,473 B2
(45) Date of Patent: Oct. 18, 2022

(54) FUEL CELL MODULE (71) Applicant: HONDA MOTOR CO., LTD., Tokyo (JP)

(72) Inventors: Hiroki Homma, Wako (JP); Yuki Yoshimine, Wako (JP); Yukihisa Kanao, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 16/942,818

(22) Filed: Jul. 30, 2020

(65) Prior Publication Data

US 2021/0043950 A1 Feb. 11, 2021

(30) Foreign Application Priority Data

Aug. 8, 2019 (JP) .............................. JP2019-145927

(51) Int. Cl.
*H01M 8/04014* (2016.01)
*H01M 8/0612* (2016.01)

(52) U.S. Cl.
CPC ..... *H01M 8/04022* (2013.01); *H01M 8/0618* (2013.01)

(58) Field of Classification Search
None
See application file for complete search history.

(56) References Cited

U.S. PATENT DOCUMENTS

| 2015/0364782 A1* | 12/2015 | Tsukamoto | ......... H01M 8/2432 422/414 |
| 2015/0380756 A1* | 12/2015 | Orishima | ............ H01M 8/0618 429/419 |

FOREIGN PATENT DOCUMENTS

| JP | 2008-166070 | * 7/2006 |
| JP | 2016-001524 | 1/2016 |

* cited by examiner

*Primary Examiner* — Alix E Eggerding
(74) *Attorney, Agent, or Firm* — Amin, Turocy & Watson, LLP (57) ABSTRACT A reformer and an evaporator of a fuel cell module are provided adjacent to each other. An exhaust gas combustion chamber which combusts a fuel exhaust gas and an oxygen-containing exhaust gas discharged from a fuel cell to produce a combustion exhaust gas includes a first chamber and a second chamber connected to each other, and a combustion chamber outlet for discharging the combustion exhaust gas in the exhaust gas combustion chamber. At least part of an outer wall surface of the first chamber faces the evaporator with clearance. At least part of a wall forming the second chamber is a common wall shared with the reformer.

10 Claims, 8 Drawing Sheets

FUEL CELL MODULE

CROSS-REFERENCE TO RELATED APPLICATION

This application is based upon and claims the benefit of priority from Japanese Patent Application No. 2019-145927 filed on Aug. 8, 2019, the contents of which are incorporated herein by reference.

BACKGROUND OF THE INVENTION

Field of the Invention

The present invention relates to a fuel cell module including a fuel cell which performs power generation consuming a fuel gas and an oxygen-containing gas supplied to the fuel cell, and discharges a fuel exhaust gas and an oxygen-containing exhaust gas.

Description of the Related Art

For example, in a fuel cell module including a solid oxide fuel cell (SOFC) using solid oxide such as stabilized zirconia as electrolyte, a fuel gas and an oxygen-containing gas are supplied to the fuel cell for inducing electrochemical reactions to perform power generation. Examples of the fuel gas include a hydrogen-containing gas which is obtained by reforming raw fuel chiefly containing hydrocarbon such as a city gas or propane gas in a reformer. Further, examples of the oxygen-containing gas include the air, etc.

Unconsumed portions of the fuel gas and the oxygen-containing gas which have not been consumed in electrochemical reactions are discharged as the fuel exhaust gas and the oxygen-containing exhaust gas from the fuel cell. For example, as shown in Japanese Laid-Open Patent Publication No. 2016-001524, a fuel cell module including a combustor where the fuel exhaust gas and the oxygen-containing exhaust gas are combusted inside an exhaust gas combustion chamber to produce a combustion exhaust gas is known. By combusting the fuel exhaust gas using the oxygen-containing exhaust gas in the combustor, it is possible to obtain heat energy, and moreover, it is possible to easily suppress discharging of the unconsumed fuel gas.

Specifically, the fuel cell module in Japanese Laid-Open Patent Publication No. 2016-001524 includes a casing held between a fuel cell and a heat exchanger for preheating the oxygen-containing gas before it is supplied to the fuel cell. The exhaust gas combustion chamber, and a frame shaped reformer facing an outer peripheral wall of the exhaust gas combustion chamber with clearance, are provided inside the casing. An outer peripheral wall of the exhaust gas combustion chamber is provided with a combustion chamber outlet for discharging the combustion exhaust gas from the exhaust gas combustion chamber. While heat exchange is performed between the combustion exhaust gas discharged from the combustion chamber outlet and the reformer, the combustion exhaust gas flows inside the casing. That is, the heat energy of the combustion exhaust gas obtained in the combustor can be utilized for heating the reformer, etc. operated in a high temperature range.

SUMMARY OF THE INVENTION

In the fuel cell module, for example, as the proportion of the usage quantity relative to the supply quantity of the fuel gas in the fuel cell (fuel utilization ratio) changes, the quantity of the unconsumed fuel gas discharged as a fuel exhaust gas changes as well. Therefore, even in the case where the quantity of the unconsumed fuel gas discharged as the fuel exhaust gas is decreased, it is required to obtain the heat energy by suitably combusting the fuel exhaust gas and an oxygen-containing exhaust gas inside the exhaust gas combustion chamber.

In an attempt to address the problem, an object of the present invention is to provide a fuel cell module in which it is possible to combust a fuel exhaust gas and an oxygen-containing exhaust gas in the exhaust gas combustion chamber suitably.

According to an aspect of the present invention, provided is a fuel cell module including a fuel cell configured to perform power generation consuming a fuel gas and an oxygen containing gas supplied to the fuel cell, and discharge a fuel exhaust gas and an oxygen-containing exhaust gas, a reformer configured to reform a raw fuel chiefly containing hydrocarbon using water vapor, and produce the fuel gas supplied to the fuel cell, an evaporator configured to evaporate water to produce the water vapor supplied to the reformer, and a combustor configured to combust the fuel exhaust gas and the oxygen-containing exhaust gas inside an exhaust gas combustion chamber to produce a combustion exhaust gas, wherein the reformer and the evaporator are provided adjacent to each other, the exhaust gas combustion chamber includes a first chamber and a second chamber connected together, and a combustion chamber outlet configured to discharge the combustion exhaust gas in the exhaust gas combustion chamber, and at least part of an outer wall surface of the first chamber faces the evaporator with clearance, and at least part of a wall forming the second chamber is a common wall shared with the reformer.

In the fuel cell module, the evaporator and the reformer are provided adjacent to each other, and the exhaust gas combustion chamber is formed to face both of the evaporator and the reformer. Specifically, the exhaust gas combustion chamber includes the first chamber which faces the evaporator with clearance, and the second chamber having the common wall shared with the reformer. Therefore, for example, it is possible to effectively utilize the space in the fuel cell module to form the exhaust gas combustion chamber having a larger volume than in the case where the exhaust gas combustion chamber is formed in a manner to face only the reformer.

As described above, since it is possible to increase the volume of the exhaust gas combustion chamber, it is possible to suppress occurrence of the situation where the fuel exhaust gas and the oxygen-containing exhaust gas are discharged from the exhaust gas combustion chamber before terminating combustion reaction. That is, it is possible to provide a long route where the fuel exhaust gas and the oxygen-containing exhaust gas flow through the exhaust gas combustion chamber while being combusted, and are discharged from the combustion chamber outlet. Further, it is possible to suppress occurrence of the situation where the rapid change which may inhibit combustion reaction occurs, in the direction in which the fuel exhaust gas and the oxygen-containing exhaust gas flow. As a result, it is possible to cause the combustion reaction of the fuel exhaust gas and the oxygen-containing exhaust gas to proceed sufficiently and suitably.

Further, since the evaporator which is operated at a lower temperature than the temperature of the reformer, etc. and the outer wall surface of the first chamber of the exhaust gas combustion chamber are disposed spaced from each other, even in the case of adopting the structure where the first chamber faces the evaporator as described above, it is possible to suppress cooling of the walls of the exhaust gas combustion chamber by the evaporator. Further, in the exhaust gas combustion chamber, the wall of the second chamber has the common wall, and the heat of the reformer operated at high temperature is directly transmitted to the common wall. As a result, it is possible to maintain the walls of the exhaust gas combustion chamber at high temperature. Therefore, even if the fuel exhaust gas and the oxygen-containing exhaust gas that are being consumed in the combustion reaction in the exhaust gas combustion chamber contact the walls of the exhaust gas combustion chamber, it is possible to suppress inhibition of the progress of the combustion reaction.

As can be seen from the above, according to this fuel cell module, it is possible to suitably combust the fuel exhaust gas and the oxygen-containing exhaust gas inside the exhaust gas combustion chamber. Moreover, it is possible to effectively obtain the heat energy produced in combustion of the fuel exhaust gas and the oxygen-containing exhaust gas.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a fuel cell module according to the present invention will be described in detail with reference to the accompanying drawings. In the drawings, the constituent elements which have the same or similar functions and which offer the same or similar advantages are labeled with the same reference numerals, and description of such constituent elements may not be repeated.

Figure 1:
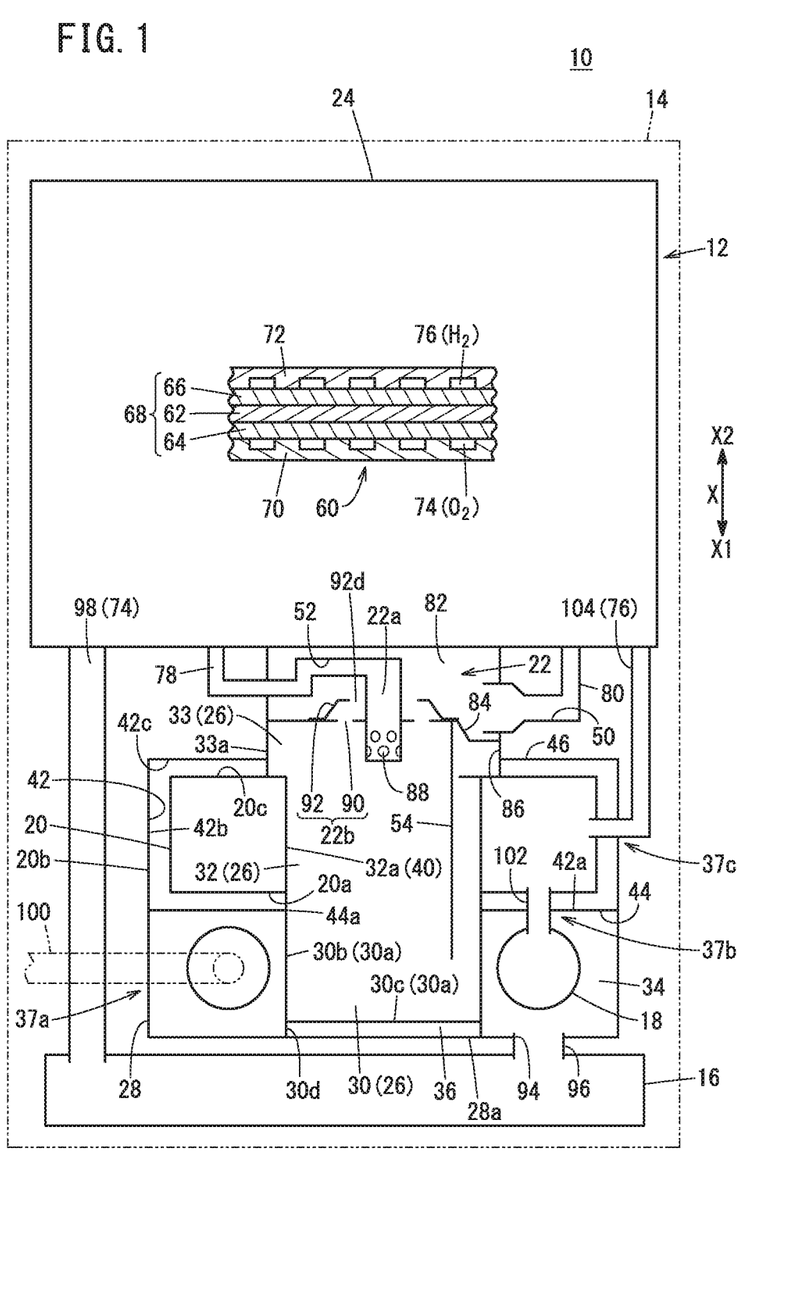
FIG. 1 is a view showing overall structure of a fuel cell module according to an embodiment of the present invention.

As shown in FIG. 1, although the embodiment of the present invention will be described in connection with the case where a fuel cell module 10 is used in a stationary application as an example, it is not essential to use the fuel cell module 10 in the stationary application specially. The fuel cell module 10 can be used in various applications such as in-vehicle applications. As a whole, the fuel cell module 10 includes a fuel cell unit 12 having a substantially rectangular parallel piped shape, and a casing 14 containing the fuel cell unit 12. Further, a heat insulating layer (not shown) is provided between the fuel cell unit 12 and the casing 14.

As shown in FIG. 1, in the fuel cell unit 12, a heat exchanger 16, an evaporator 18, a reformer 20, a combustor 22, and a fuel cell 24 are provided substantially in this order from the lower side (in a direction indicated by an arrow X1) to the upper side (in a direction indicated by an arrow X2) in the vertical direction (indicated by an arrow X). The fuel cell unit 12 further includes an exhaust gas combustion chamber 26 accommodating the combustor 22, and an auxiliary device case 28 accommodating the evaporator 18 and the reformer 20.

Figure 4:
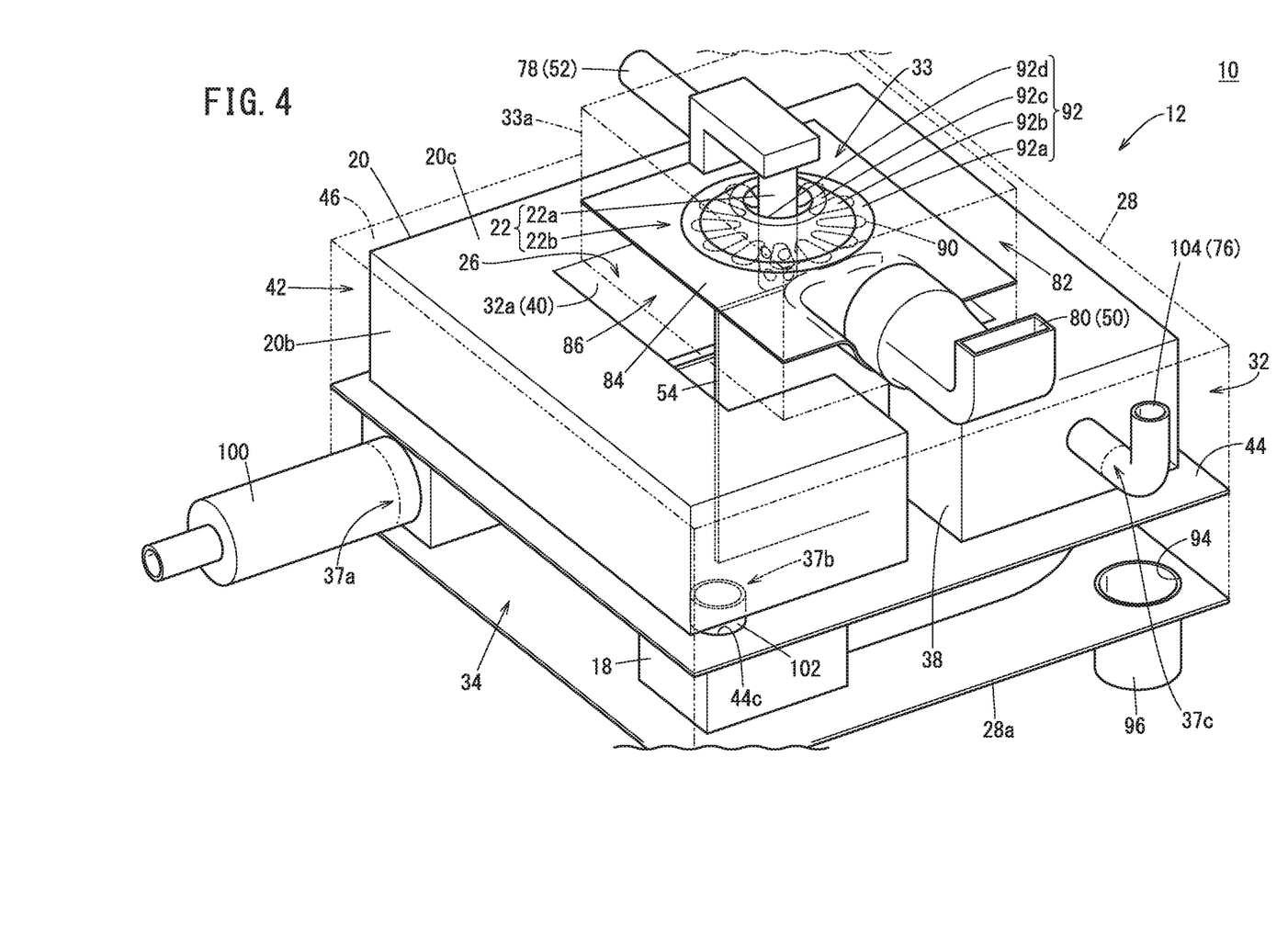
FIG. 4 is a perspective view illustrating the auxiliary device case and the exhaust gas combustion chamber entirely.

As shown in FIG. 4, as viewed in the vertical direction, the exhaust gas combustion chamber 26 is provided at substantially the center of the fuel cell unit 12. Further, as shown in FIG. 1, as viewed in the vertical direction of the fuel cell unit 12, the exhaust gas combustion chamber 26 is provided between the fuel cell 24 and the heat exchanger 16. Specifically, the exhaust gas combustion chamber 26 includes a first chamber 30, a second chamber 32, and a third chamber 33 that are connected together. The first chamber 30, the second chamber 32, and the third chamber 33 are arranged in this order from the lower side (indicated by the arrow X1) toward the upper side (indicated by the arrow X2) in the vertical direction. Stated otherwise, the direction in which the first chamber 30, the second chamber 32, and the third chamber 33 are arranged is oriented in the vertical direction (indicated by the arrow X).

Figure 3:
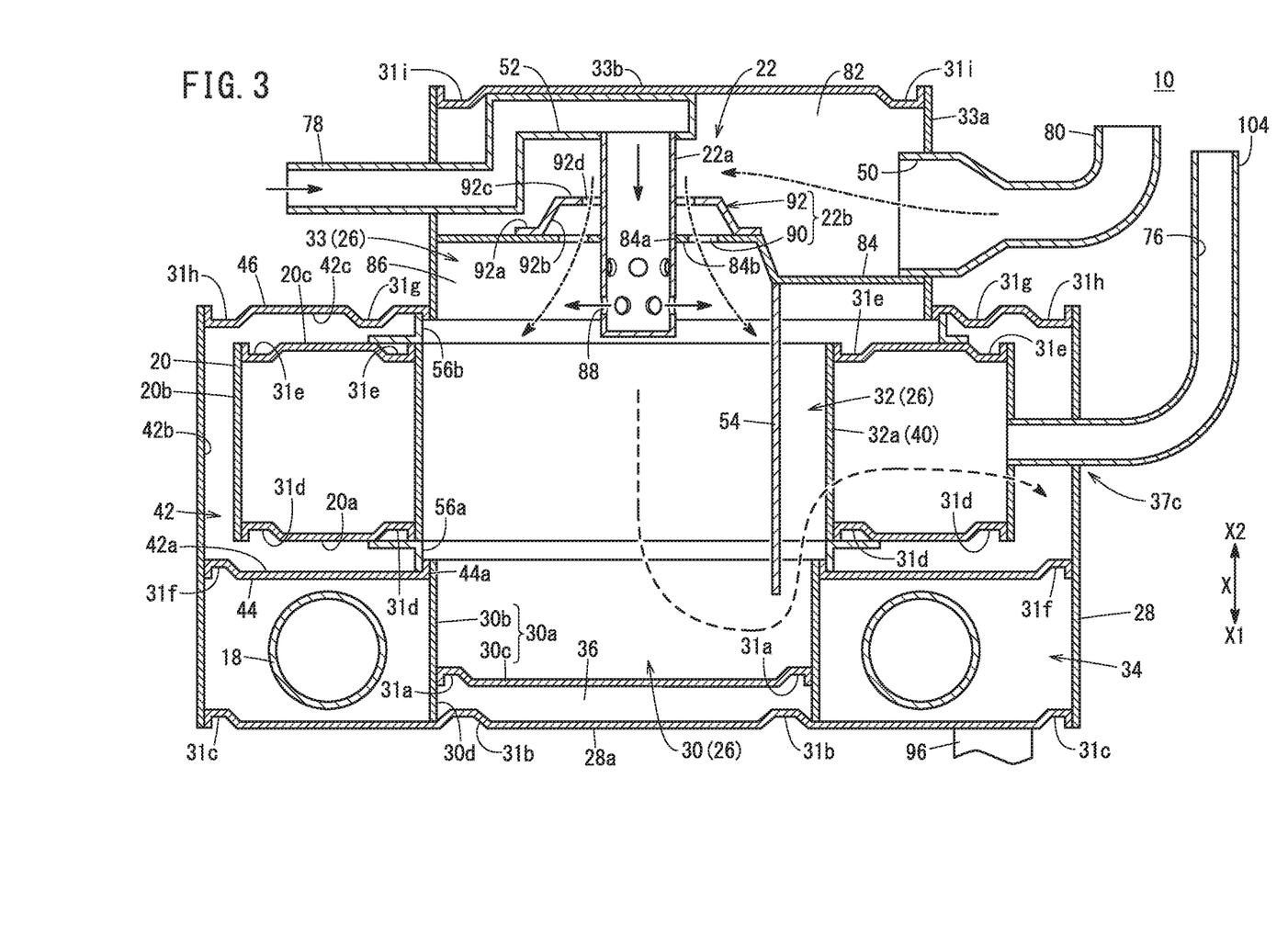
FIG. 3 is a cross sectional view illustrating the principal parts of the inside of an auxiliary device case and the inside of an exhaust gas combustion chamber.
Figure 5:
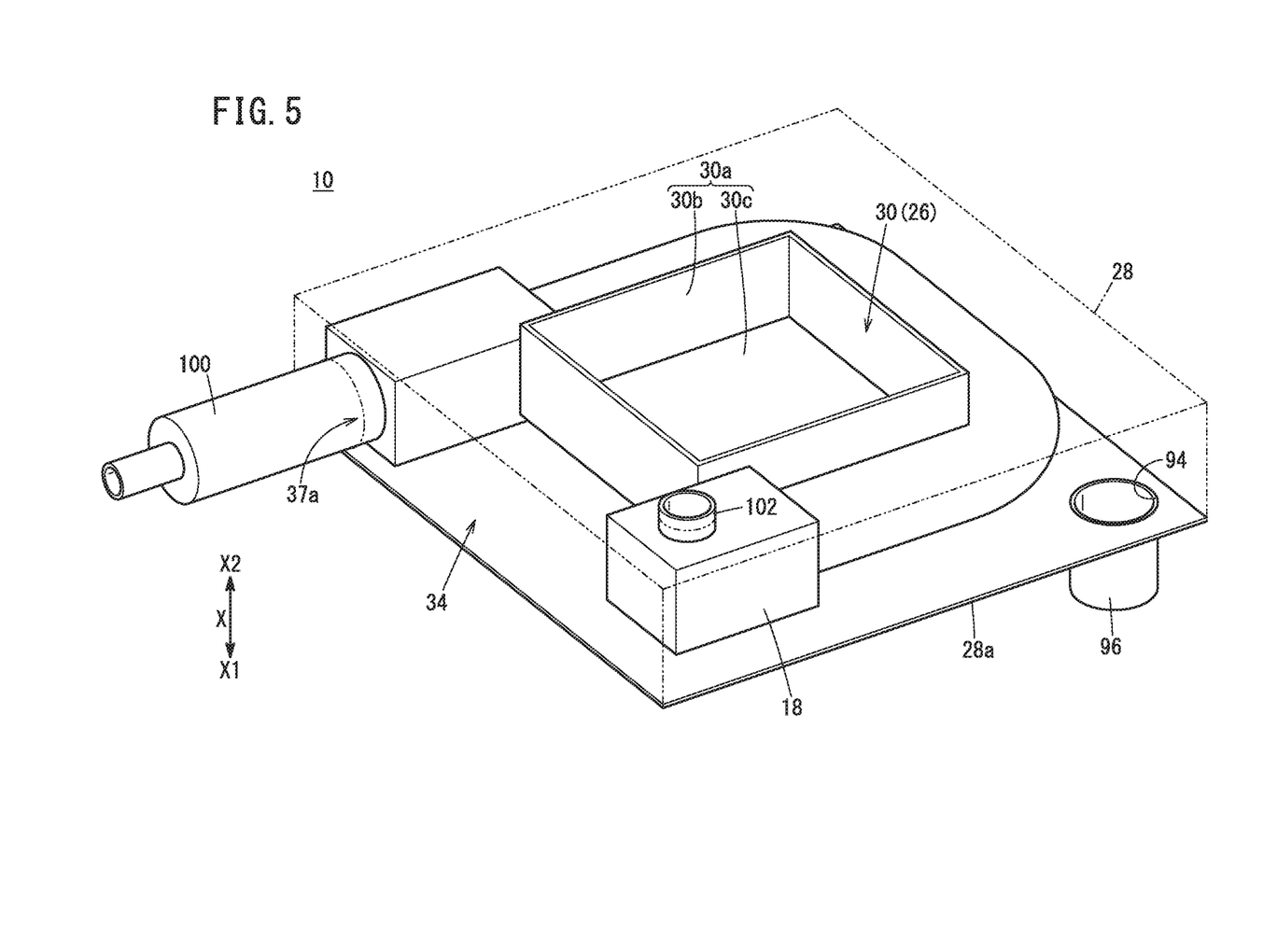
FIG. 5 is a perspective view illustrating the inside of an evaporator accommodation chamber.

In the embodiment of the present invention, as shown in FIGS. 3 and 5, a first wall 30a forming the first chamber 30 has a case shape which is open at the top and closed at the bottom. That is, the first wall 30a includes a first outer peripheral wall 30b and a first bottom wall 30c. As shown in FIG. 5, three out of four outer wall surfaces forming the first outer peripheral wall 30b are provided to face the evaporator 18 with clearance. Therefore, as viewed in the vertical direction, the evaporator 18 has a U-shape (or C-shape) which surrounds three outer wall surfaces of the first outer peripheral wall 30b.

As shown in FIG. 3, an uneven section 31a for absorbing heat deformation of the first bottom wall 30c is provided in the outer marginal portion of the first bottom wall 30c. In the embodiment of the present invention, the uneven section 31a has a groove shape provided along the outer marginal portion of the first bottom wall 30c in a manner as to be depressed toward the inside of the first chamber 30 (exhaust gas combustion chamber 26). However, the uneven section 31a is not limited to have the above structure as long as the uneven section 31a has the shape such that generation of thermal stress can be suppressed even if the temperature of the first bottom wall 30c, etc. changes. The same applies to uneven sections 31b to 31i described below. The uneven sections 31b to 31i should have the shape, with respect to the walls in which the uneven sections 31b to 31i are provided, such that generation of the thermal stress due to the temperature change can be suppressed. It should be noted that the uneven sections 31a to 31i are not illustrated in the drawings other than FIG. 3.

The first chamber 30 (first wall 30a) and the evaporator 18 are accommodated in an evaporator accommodation chamber 34 provided at the bottom of the auxiliary device case 28. As shown in FIGS. 1 and 3, protrusions 30d are provided partially (e.g., at four corners as viewed in the vertical direction) at the lower end of the first outer peripheral wall 30b of the first chamber 30, in a manner to protrude below the first bottom wall 30c.

The protrusion 30d contacts a bottom wall 28a of the auxiliary device case 28 to form a space 36 between the first bottom wall 30c of the first chamber 30 and the bottom wall 28a of the auxiliary device case 28. The first bottom wall 30c and the auxiliary device case 28 are not connected (joined) together and merely contact each other through the protrusion 30d so as to be movable relative to each other. The bottom wall 28a of the auxiliary device case 28 is provided with the uneven sections 31b, 31c for absorbing heat deformation of the auxiliary device case 28, respectively in the inner marginal portion which contacts the protrusion 30d and the outer marginal portion of the bottom wall 28a.

As shown in FIG. 5, the auxiliary device case 28 (peripheral wall of the evaporator accommodation chamber 34) surrounds the outer periphery of the evaporator 18 with clearance. Further, only part of the bottom of the evaporator 18 contacts the bottom wall 28a of the auxiliary device case 28. The bottom wall 28a of the auxiliary device case 28 and part of the bottom of the evaporator 18 are not connected (joined) together and merely contact each other so as to be movable relative to each other. As described later, the evaporator 18 and the auxiliary device case 28 are connected together only by a first connector section 37a which is a section connecting a raw fuel inlet pipe 100 connected to the evaporator 18 described later and a side wall (peripheral wall) of the auxiliary device case 28 (evaporator accommodation chamber 34).

Figure 7:
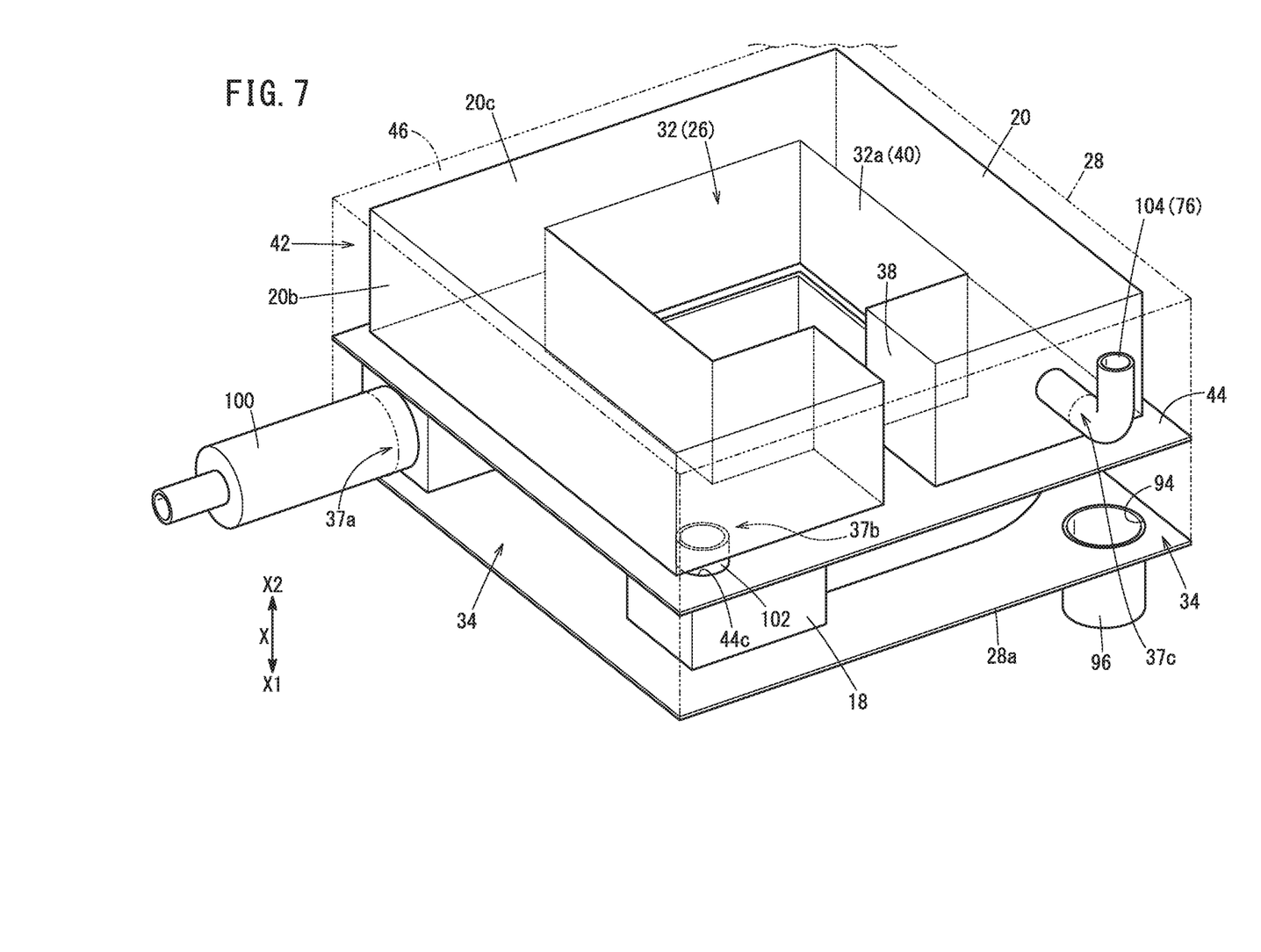
FIG. 7 is a perspective view illustrating the inside of a reformer accommodation chamber.

In the embodiment of the present invention, as shown in FIGS. 3 and 7, a second wall 32a (wall) forming the second chamber 32 has a substantially rectangular cylindrical shape which is open at the top and the bottom. Further, as shown in FIG. 7, a combustion chamber outlet 38 in the form of a slit extending along the vertical direction (indicated by the arrow X) is provided in part of the second wall 32a in the peripheral direction. The entire second wall 32a is a common wall 40 shared with the reformer 20. That is, the second wall 32a (common wall 40) forms the second chamber 32 of the exhaust gas combustion chamber 26, and forms the inner peripheral wall of the reformer 20.

Therefore, as viewed in the vertical direction, the reformer 20 according to the embodiment of the present invention has a frame shape (C-shape or U-shape) extending around the outer periphery of the second chamber 32 except for the combustion chamber outlet 38. Further, both ends of the reformer 20 in the direction in which the reformer 20 extends (peripheral direction) are spaced from each other, and the combustion chamber outlet 38 is provided between the both ends. As shown in FIG. 3, the uneven sections 31d, 31e for absorbing heat deformation of the wall the reformer 20 are provided in the marginal portion of the bottom wall and the marginal portion of the upper wall of the reformer 20, respectively.

As shown in FIGS. 3 and 7, the second chamber 32 and the reformer 20 are accommodated in a reformer accommodation chamber 42 provided inside the auxiliary device case 28. The inside of the auxiliary device case 28 is divided into the upper and lower portions in the vertical direction by a compartment wall 44, and the evaporator accommodation chamber 34 is formed on the lower side, and the reformer accommodation chamber 42 is formed on the upper side.

Figure 6:
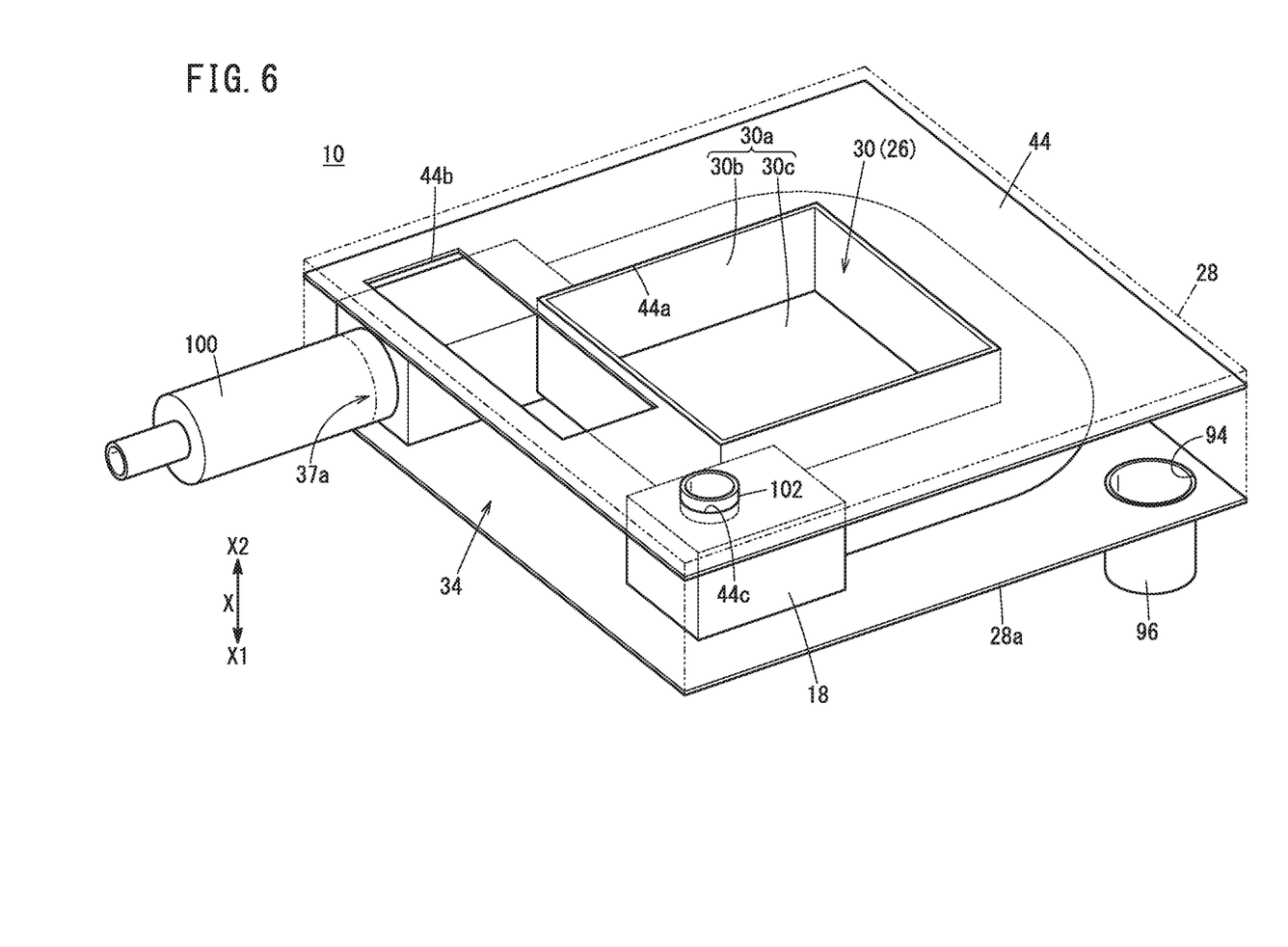
FIG. 6 is a perspective view illustrating a compartment wall.

As shown in FIG. 6, the compartment wall 44 has a frame shape where an opening 44a for connecting the second chamber 32 and the first chamber 30 is provided at substantially the center as viewed in the vertical direction. That is, as shown in FIG. 3, the compartment wall 44 is provided at the bottom of the reformer accommodation chamber 42 on the outer peripheral side of the first chamber 30.

As shown in FIG. 6, the compartment wall 44 is provided with an accommodation chamber connection port 44b connecting the reformer accommodation chamber 42 (FIGS. 3 and 7) and the evaporator accommodation chamber 34. As shown in FIG. 3, the uneven section 31f for absorbing heat deformation of the compartment wall 44 is provided in the outer marginal portion of the compartment wall 44.

As shown in FIGS. 3 and 4, the upper part of the reformer accommodation chamber 42 is closed by an upper wall 46. Therefore, in the reformer accommodation chamber 42, as viewed in the vertical direction, the portion excluding the second chamber 32 is covered with the frame shaped upper wall 46. As shown in FIG. 3, the uneven sections 31g, 31h for absorbing heat deformation of the upper wall 46 are provided in the inner marginal portion and the outer marginal portion of the upper wall 46 of the auxiliary device case 28, respectively.

In the reformer accommodation chamber 42, the outer wall surfaces (an outer bottom surface 20a, an outer peripheral surface 20b, an outer upper surface 20c) of the reformer 20 excluding the surface of the common wall 40 and the inner wall surfaces (an inner bottom surface 42a, an inner peripheral surface 42b, an inner upper surface 42c) of the reformer accommodation chamber 42, are provided spaced from each other to form a space between the outer wall surfaces and the inner wall surfaces. That is, the auxiliary device case 28 (peripheral wall of the reformer accommodation chamber 42) surrounds the outer periphery of the reformer 20 with clearance.

A lower end side (indicated by the arrow X1) of a third wall 33a of the third chamber 33 is coupled to an upper end side (indicated by the arrow X2) of the auxiliary device case 28. The third wall 33a has a case shape which is open at the bottom and closed at the top. The lower end (end on the side indicated by the arrow X1) of the third wall 33a is connected to the inner marginal portion (opening marginal portion) of the upper wall 46 having the frame shape. In the structure, the third chamber 33 inside the third wall 33a and the second chamber 32 inside the second wall 32a are connected together.

The combustor 22, part of an oxygen-containing exhaust gas channel 50 for supplying an oxygen-containing exhaust gas described later to the combustor 22, and part of a fuel exhaust gas channel 52 for supplying a fuel exhaust gas described later to the combustor 22 are provided inside the third chamber 33. It should be noted that the details of the inside of the third chamber 33 will be given later. As shown in FIG. 3, the uneven section 31i for absorbing heat deformation of an upper wall 33b is provided in the outer marginal portion of the upper wall 33b of the third wall 33a.

A guide wall 54 extending in the vertical direction is provided in the exhaust gas combustion chamber 26 from the third chamber 33 to the first chamber 30 through the second chamber 32. It should be noted that, in FIGS. 5 to 7, illustration of the guide wall 54 is omitted. In the embodiment of the present invention, one guide wall 54 is provided inside the exhaust gas combustion chamber 26, adjacent to the combustion chamber outlet 38 (FIGS. 4 and 7). The position where the guide wall 54 is provided, and the number of the guide walls 54 are not limited specially. A plurality of the guide walls 54 may be provided. Further, as long as the guide wall 54 extends in the vertical direction as a whole, curved portions or inclined portions (not shown) may be provided therein.

As shown in FIG. 3, in the auxiliary device case 28, interruption members 56a, 56b are provided between the upper end of the first wall 30a and the lower end of the second wall 32a, and between the upper wall of the second wall 32a and the lower end of the third wall 33a, respectively. The connection between the inside of the exhaust gas combustion chamber 26 and the inside of the auxiliary device case 28 is interrupted by these interruption members 56a, 56b. Further, the interruption member 56a provided between the upper end of the first wall 30a and the lower end of the second wall 32a is also interposed between the outer bottom surface 20a of the reformer 20 and the inner bottom surface 42a of the reformer accommodation chamber 42 (upper surface of the compartment wall 44). In the structure, the state where the outer bottom surface 20a of the reformer 20 and the inner bottom surface 42a of the reformer accommodation chamber 42 are spaced from each other is maintained.

As shown in FIG. 1, the fuel cell 24 is provided above the third chamber 33 (on the side indicated by the arrow X2). The fuel cell 24 is a solid oxide fuel cell (SOFC). In the embodiment of the present invention, the fuel cell 24 is in the form of a stack formed by stacking a plurality of flat plate type power generation cells 60 in the vertical direction (indicated by the arrow X). It should be noted that the fuel cell 24 may be formed by electrically connecting together a plurality of cylindrical power generation cells (not shown).

For example, each of the power generation cells 60 includes an electrolyte electrode assembly 68 (MEA) including a cathode 64 and an anode 66 provided on both surfaces of an electrolyte 62 made of oxide ion conductor such as stabilized zirconia. A cathode separator 70 and an anode separator 72 are provided on both sides of the electrolyte electrode assembly 68. An oxygen-containing gas channel 74 for supplying the oxygen-containing gas containing oxygen ($O_2$) such as the air to the cathode 64 is partially formed on the cathode separator 70. A fuel gas channel 76 for supplying the fuel gas containing hydrogen ($H_2$) to the anode 66 is partially formed on the anode separator 72.

In the fuel cell 24, the fuel gas supplied to the anode 66 through the fuel gas channel 76 and the oxygen-containing gas supplied to the cathode 64 through the oxygen containing gas channel 74 are partially consumed in electrochemical reactions to perform power generation. The fuel exhaust gas as a residual fuel gas which has not been consumed in the electrochemical reaction is discharged into a fuel exhaust gas pipe 78 forming part of the fuel exhaust gas channel 52. The oxygen-containing exhaust gas as a residual oxygen-containing gas which has not been consumed in the electrochemical reaction is discharged into an oxygen-containing exhaust gas pipe 80 forming part of the oxygen-containing exhaust gas channel 50.

As shown in FIG. 3, the downstream side of the oxygen-containing exhaust gas pipe 80 penetrates through the third wall 33a of the third chamber 33 in a substantially horizontal direction, and opened to a channel space 82 in the third chamber 33. The channel space 82 is space forming part of the oxygen-containing exhaust gas channel 50 inside the third chamber 33. That is, the oxygen-containing exhaust gas discharged from the fuel cell 24 (FIG. 1) flows into the channel space 82 in the third chamber 33 through the oxygen-containing exhaust gas pipe 80.

On the other hand, the downstream side of the fuel exhaust gas pipe 78 penetrates through the third wall 33a of the third chamber 33 in the horizontal direction, and is connected to a fuel exhaust gas nozzle 22a of the combustor 22 at an upper position in the third chamber 33 (channel space 82). That is, the fuel exhaust gas discharged from the fuel cell 24 is supplied to the fuel exhaust gas nozzle 22a through the fuel exhaust gas pipe 78. In this manner, the fuel exhaust gas channel 52 is partially provided inside the third chamber 33.

Figure 8:
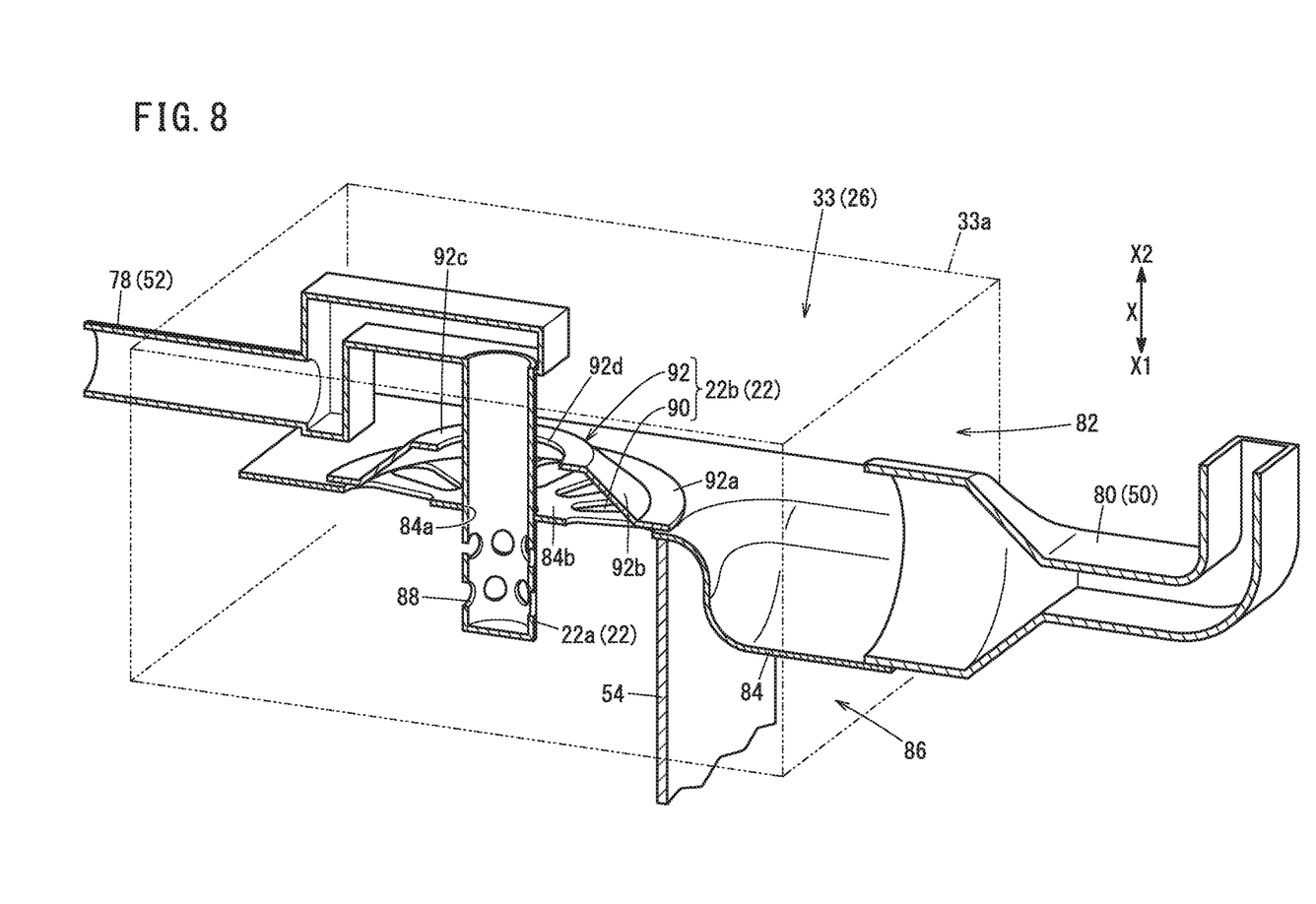
FIG. 8 is a perspective view illustrating a third chamber.

The inside of the third chamber 33 is divided by a partition plate 84 in an upper/lower direction. The channel space 82 is formed above the partition plate 84, and a combustion space 86 connected to the second chamber 32 is formed below the partition plate 84. As shown in FIGS. 3 and 8, the fuel exhaust gas nozzle 22a of the combustor 22 is inserted into an insertion hole 84a penetrating through the partition plate 84 to extend in the vertical direction over the channel space 82 and the combustion space 86. Therefore, the downstream side of the fuel exhaust gas nozzle 22a is provided in the combustion space 86. For example, the outer diameter of the fuel exhaust gas nozzle 22a and the diameter of the insertion hole 84a of the partition plate 84 are set to have substantially the same size. Therefore, the portion between the outer peripheral surface of the fuel exhaust gas nozzle 22a and the inner peripheral surface of the insertion hole 84a of the partition plate 84 is air-tight.

The fuel exhaust gas nozzle 22a has a cylindrical shape having a closed lower end. Further, a plurality of fuel exhaust gas injection holes 88 are formed in the portion of the fuel exhaust gas nozzle 22a provided in the combustion space 86. The fuel exhaust gas injection holes 88 penetrate through the peripheral wall of the fuel exhaust gas nozzle 22a. Therefore, as shown by arrows indicated by solid lines in FIG. 3, the fuel exhaust gas supplied from the fuel exhaust gas channel 52 in the fuel exhaust gas pipe 78 to the fuel exhaust gas nozzle 22a is injected from the fuel exhaust gas injection holes 88 to the inside of the combustion space 86 in the substantially horizontal direction.

The combustor 22 combusts the oxygen-containing exhaust gas and the fuel exhaust gas inside the exhaust gas combustion chamber 26 (the first chamber 30, the second chamber 32, the combustion space 86 of the third chamber 33) to produce the combustion exhaust gas, and has an oxygen-containing exhaust gas rectifier unit 22b and an igniter (not shown) in addition to the above-described fuel exhaust gas nozzle 22a. The oxygen-containing exhaust gas rectifier unit 22b includes oxygen-containing exhaust gas injection holes 90 formed to penetrate through the partition plate 84, and a rectifier cover 92 covering the oxygen-containing exhaust gas injection holes 90 in the channel space 82.

A plurality of the oxygen-containing exhaust gas injection holes 90 are provided in the marginal portion on the outer peripheral side of the insertion hole 84a of the partition plate 84 at intervals from each other in the circumferential direction, to connect the inside of the rectifier cover 92 and the combustion space 86. As shown in FIGS. 4 and 8, preferably, as viewed in the vertical direction, the oxygen-containing exhaust gas injection holes 90 each have an oval shape such that the radius of curvature thereof on the central side is smaller than the radius of curvature thereof on the outer side in the radial direction of the insertion hole 84a (FIG. 8).

These oxygen-containing exhaust gas injection holes 90 are provided outside the insertion hole 84a in the radial direction with clearance from the insertion hole 84a, in the partition plate 84. Therefore, a plate shaped portion 84b is provided between the insertion hole 84a of the partition plate 84 and the oxygen-containing exhaust gas injection holes 90.

As shown in FIG. 8, the rectifier cover 92 is provided with a flange 92a at the lower end, a tapered portion 92b having a diameter decreased from the inner marginal portion of the flange 92a toward the upper side, and an upper wall 92c having a doughnut shape (ring shape) extending from the upper end of the tapered portion 92b toward the central side in the radial direction, the flange 92a, the tapered portion 92b, and the upper wall 92c being formed integrally. It should be noted that the flange 92a, the tapered portion 92b, and the upper wall 92c may be made of the same material integrally, or may be formed as separate members and joined together afterward.

The lower surface of the flange 92a of the rectifier cover 92 contacts the partition plate 84, on the outer peripheral side of the oxygen-containing exhaust gas injection holes 90. The fuel exhaust gas nozzle 22a is inserted into an opening provided at the center of the upper wall 92c in the radial direction. The diameter of the opening of the upper wall 92c is larger than the outer diameter of the fuel exhaust gas nozzle 22a. In the structure, an oxygen-containing exhaust gas inlet 92d is formed between the outer peripheral surface of the fuel exhaust gas nozzle 22a and the inner peripheral surface of the opening of the upper wall 92c. The oxygen-containing exhaust gas inlet 92d allows the oxygen-containing exhaust gas in the channel space 82 to flow into a portion between the rectifier cover 92 and the partition plate 84.

As viewed in the vertical direction, the majority part of the oxygen-containing exhaust gas inlet 92d faces the plate shaped portion 84b of the partition plate 84. Further, the oxygen-containing exhaust gas which flowed from the oxygen-containing exhaust gas inlet 92d flows downward along the tapered portion 92b toward the outside in the radial direction. In the structure, as denoted by arrows indicated by one dot chain lines in FIG. 3, the oxygen-containing exhaust gas injected from the oxygen-containing exhaust gas injection holes 90 to the combustion space 86 flows toward the outside in the radial direction of the fuel exhaust gas nozzle 22a while spreading downward.

The igniter is provided adjacent to the fuel exhaust gas injection holes 88 and the oxygen-containing exhaust gas injection holes 90 in the combustion space 86. Further, for example, at the time of starting operation of the fuel cell module 10, the igniter causes the fuel exhaust gas injected from the fuel exhaust gas injection holes 88 and the oxygen-containing exhaust gas injected from the oxygen-containing exhaust gas injection holes 90 to ignite to start combustion reaction. It should be noted that, as an igniter, an ignition device and/or an ignition heater may be used.

As described above, in the combustor 22, the oxygen-containing exhaust gas and the fuel exhaust gas are injected toward the flame in the exhaust gas combustion chamber 26 to combust the oxygen-containing exhaust gas and the fuel exhaust gas. As a result, for example, the temperature of the exhaust gas combustion chamber 26 is increased to the hot temperature of about 700° C., and the combustion exhaust gas at high temperature is produced. As shown by an arrow indicated by a broken line in FIG. 3, after the combustion exhaust gas is guided by the guide wall 54 to flow inside the exhaust gas combustion chamber 26 from the third chamber 33 into the first chamber 30 through the second chamber 32, the combustion exhaust gas is guided to the combustion chamber outlet 38 (FIGS. 4 and 7) provided in the second wall 32a of the second chamber 32. The combustion exhaust gas discharged from the exhaust gas combustion chamber 26 through the combustion chamber outlet 38 flows through the space formed between the outer wall surface of the reformer 20 and the inner wall surface of the reformer accommodation chamber 42 as described above to perform heat exchange with the reformer 20, and heat the reformer 20.

The combustion exhaust gas, which has been subjected to heat exchange with the reformer 20 in the reformer accommodation chamber 42, flows into the evaporator accommodation chamber 34 through the accommodation chamber connection port 44b (FIG. 6) provided in the compartment wall 44 of the auxiliary device case 28. In the evaporator accommodation chamber 34, the first chamber 30 and the evaporator 18 performs heat exchange with the combustion exhaust gas to keep the temperature of the exhaust gas combustion chamber 26 and heat the evaporator 18.

As shown in FIGS. 4 to 7, the combustion exhaust gas which has been subjected to heat exchange with the first chamber 30 and the evaporator 18 inside the evaporator accommodation chamber 34 is discharged from the evaporator accommodation chamber 34 through a combustion exhaust gas outlet 94 provided in the bottom wall 28a of the auxiliary device case 28. As shown in FIGS. 1 and 4 to 7, a combustion exhaust gas pipe 96 is connected to the combustion exhaust gas outlet 94. As shown in FIG. 1, the combustion exhaust gas pipe 96 connects the auxiliary device case 28 and the heat exchanger 16. That is, the combustion exhaust gas discharged from the evaporator accommodation chamber 34 is supplied to the heat exchanger 16 through the combustion exhaust gas pipe 96.

The heat exchanger 16 performs heat exchange between the oxygen-containing gas supplied from an oxygen-containing gas supply source (not shown) and the combustion exhaust gas supplied through the combustion exhaust gas pipe 96 as described above. In this manner, the oxygen-containing gas is preheated (heated) before it is supplied to the fuel cell 24. That is, the oxygen-containing gas preheated at the heat exchanger 16 is supplied to the fuel cell 24 through an oxygen-containing gas supply pipe 98 forming part of the oxygen-containing gas channel 74.

On the other hand, the raw fuel chiefly containing hydrocarbon such as a city gas or propane gas is supplied to the evaporator 18 from a fuel gas supply source (not shown), and water is supplied to the evaporator 18 from a water supply source (not shown). The raw fuel and water are supplied to the inside of the evaporator 18 through a common raw fuel inlet pipe 100 (FIG. 1 and FIGS. 4 to 7). The evaporator 18 performs heat exchange with the combustion exhaust gas in the evaporator accommodation chamber 34 as described above, whereby the raw fuel is preheated, and water is evaporated into water vapor. The operating temperature of the evaporator 18 is, e.g., about 100° C. to 200° C.

It should be noted that, as shown in FIGS. 4 to 7, the raw fuel inlet pipe 100 extends to penetrate through the side wall (peripheral wall) of the auxiliary device case 28 (evaporator accommodation chamber 34). At this penetrating part, the raw fuel inlet pipe 100 and the auxiliary device case 28 are connected together to form the first connector section 37a.

As shown in FIGS. 1 and 4 and 7, the water vapor obtained by the evaporator 18 and the raw fuel preheated by the evaporator 18 are supplied to the inside of the reformer 20 through a connection pipe 102 connecting the evaporator 18 and the reformer 20. The evaporator 18 and the reformer 20 are connected together only by a second connector section 37b through the connection pipe 102. Further, the connection pipe 102 is inserted into a through hole 44c provided in the compartment wall 44 (FIGS. 4, 6, and 7) in a manner to extend over the evaporator accommodation chamber 34 and the reformer accommodation chamber 42. However, the connection pipe 102 and the compartment wall 44 are not connected (joined) together.

In the reformer 20, steam reforming reaction for producing hydrogen from the water vapor and the raw fuel is induced to produce a fuel gas. In the case where the temperature of the reformer 20 and a reforming catalyst (not shown) provided inside the reformer 20 is high, e.g., about 600° C. to 700° C., it is possible to induce steam reforming reaction stably. That is, the reformer 20 is operated in the high temperature range. Further, the steam reforming reaction is endothermic reaction. Therefore, in order to produce the fuel gas suitably in the reformer 20, preferably, heat is applied continuously from the outside of the reformer 20.

In the embodiment of the present invention, as described above, it is possible to continuously apply heat to the reformer 20 from the outside, by heat exchange with the combustion exhaust gas inside the reformer accommodation chamber 42. Further, since the reformer 20 and the exhaust gas combustion chamber 26 have the common wall 40, it is possible to continuously apply the heat of the exhaust gas combustion chamber 26 to the reformer 20. As a result, it is possible to suitably induce steam reforming reaction, and obtain the fuel gas.

Further, since the reformer 20 and the exhaust gas combustion chamber 26 have the common wall 40, it is possible to heat the reformer 20 as described above, and the heat of the reformer 20 operated in the high temperature range can be transmitted to the exhaust gas combustion chamber 26 through the common wall 40. Therefore, it is possible to maintain the temperature of the wall (e.g., the second wall 32a) forming the exhaust gas combustion chamber 26 at high temperature.

The fuel gas obtained by the reformer 20 is supplied to the fuel cell 24 through a fuel gas supply pipe 104 which connects the reformer 20 and the fuel cell 24, and forms part of the fuel gas channel 76.

As shown in FIG. 1, the upstream side of the fuel gas supply pipe 104 is connected to the reformer 20 inside the reformer accommodation chamber 42. Further, the downstream side of the fuel gas supply pipe 104 is connected to the fuel cell 24 outside the auxiliary device case 28 and inside the casing 14. As shown in FIGS. 1, 3, 4, and 7, the fuel gas supply pipe 104 penetrates through the side wall (peripheral wall) of the auxiliary device case 28 (reformer accommodation chamber 42), between the upstream side and the downstream side of the fuel gas supply pipe 104, and in this penetrating part, the fuel gas supply pipe 104 and the auxiliary device case 28 are connected together. The reformer 20 and the auxiliary device case 28 are connected together only by a third connector section 37c which is a section connecting the fuel gas supply pipe 104 and the side wall of the auxiliary device case 28.

Operation of the fuel cell module 10 basically having the above structure will be described in line with the flow of fluid flowing through the fuel cell unit 12.

Figure 2:
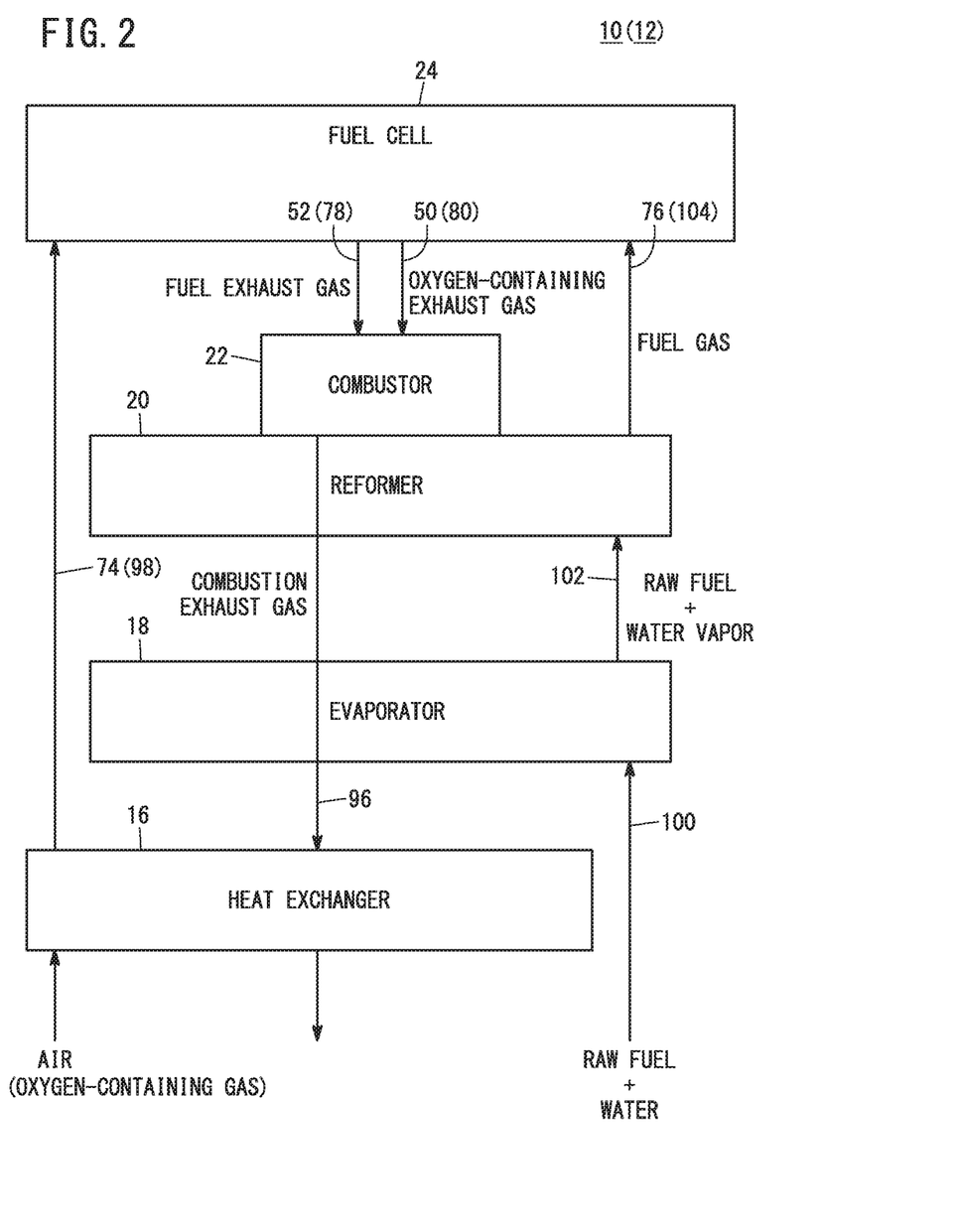
FIG. 2 is a block diagram illustrating flow of fluid in the fuel cell module in FIG. 1.

As shown in FIG. 2, during operation of the fuel cell module 10, an oxygen-containing gas is supplied from the oxygen-containing gas supply source to the heat exchanger 16 through an oxygen-containing gas inlet pipe (not shown). Further, the raw fuel from the fuel gas supply source and the water from the water supply source are supplied to the inside of the evaporator 18 through the raw fuel inlet pipe 100.

The oxygen-containing gas supplied to the heat exchanger 16 is heated by heat exchange with the combustion exhaust gas, and then, as shown in FIG. 1, flows through the oxygen-containing gas supply pipe 98, and is supplied to the oxygen-containing gas channel 74 provided in each of the power generation cells 60 of the fuel cell 24.

On the other hand, the raw fuel and water supplied to the inside of the evaporator 18 is heated by heat exchange with the combustion exhaust gas through the wall of the evaporator 18 in the evaporator accommodation chamber 34. As a result, the heated raw fuel and the water vapor produced by evaporating water flow through the connection pipe 102, and are supplied to the inside of the reformer 20.

In the reformer 20, the fuel gas is produced by inducing steam vapor reforming reaction of the raw fuel and the water vapor. At this time, the suitable operating temperature of the reformer 20 is maintained by heat exchange with the combustion exhaust gas in the reformer accommodation chamber 42 and transmission of heat of the exhaust gas combustion chamber 26 through the common wall 40. Further, as described above, since the raw fuel heated by the evaporator 18 is supplied to the reformer 20 together with the water vapor, it is possible to maintain the temperature of the reformer 20 at high temperature more suitably than in the case where non-heated raw fuel is supplied. The fuel gas obtained at the reformer 20 flows through the fuel gas supply pipe 104, and is supplied to the fuel gas channel 76 provided in each of the power generation cells 60 of the fuel cell 24.

In each of the power generation cells 60 of the fuel cell 24, electrochemical reactions of the oxygen-containing gas supplied from the oxygen-containing gas supply pipe 98 through the heat exchanger 16 and the fuel gas supplied from the fuel gas supply pipe 104 through the evaporator 18 and the reformer 20 are induced to perform power generation. Further, the oxygen-containing gas which has not been consumed in the electrochemical reactions is discharged as the oxygen-containing exhaust gas into the oxygen-containing exhaust gas pipe 80, and the fuel gas which has not been consumed in the electrochemical reaction is discharged as the fuel exhaust gas into the fuel exhaust gas pipe 78.

As shown in FIG. 3, the fuel exhaust gas discharged into the fuel exhaust gas pipe 78 flows through the downstream side of the fuel exhaust gas pipe 78 provided inside the third chamber 33 (channel space 82) of the exhaust gas combustion chamber 26, and is supplied to the fuel exhaust gas nozzle 22a. The fuel exhaust gas nozzle 22a injects the fuel exhaust gas from the fuel exhaust gas injection holes 88 to the inside of the combustion space 86 in the substantially horizontal direction.

In the meanwhile, the oxygen-containing exhaust gas discharged into the oxygen-containing exhaust gas pipe 80 flows into the channel space 82 forming part of the oxygen-containing exhaust gas channel 50 in the upper part in the third chamber 33. In the channel space 82, the oxygen-containing exhaust gas flows into a portion between the rectifier cover 92 and the partition plate 84 through the oxygen-containing exhaust gas inlet 92d provided in the rectifier cover 92. Then, the oxygen-containing exhaust gas is injected into the combustion space 86 provided in the lower part of the third chamber 33, through the oxygen-containing exhaust gas injection holes 90 provided in the partition plate 84.

As described above, since the oxygen-containing exhaust gas injected in this manner flows on the lower side, toward the outer side in the radial direction of the fuel exhaust gas nozzle 22a, it is possible to prevent the oxygen-containing exhaust gas from being blown toward the fuel exhaust gas injection holes 88. That is, in the exhaust gas combustion chamber 26, it is possible to suppress blow-out of the flame produced in combustion of the fuel exhaust gas, and suitably induce combustion reaction of the oxygen-containing exhaust gas and the fuel exhaust gas.

Further, as described above, the fuel exhaust gas injected from the fuel exhaust gas injection holes 88 and the oxygen-containing exhaust gas injected from the oxygen-containing exhaust gas injection holes 90 flow in the exhaust gas combustion chamber 26, and are combusted to produce the combustion exhaust gas. As described above, the guide wall 54 extending from the third chamber 33 to the first chamber 30 in the vertical direction is provided inside the exhaust gas combustion chamber 26.

By this guide wall 54, the fuel exhaust gas and the oxygen-containing exhaust gas are guided in a manner to flow from the upper side of the exhaust gas combustion chamber 26 (the combustion space 86 of the third chamber 33 and the second chamber 32) toward the first chamber 30 on the lower side, and combusted. That is, for example, the guide wall 54 can suppress movement of the fuel exhaust gas injected from the fuel exhaust gas injection holes 88 and the oxygen-containing exhaust gas injected from the oxygen-containing exhaust gas injection holes 90 directly toward the combustion chamber outlet 38 (FIGS. 4 and 7) of the second chamber 32.

The combustion exhaust gas produced in the exhaust gas combustion chamber 26 is discharged from the combustion chamber outlet 38 of the second chamber 32 shown in FIGS. 4 and 7 to a portion between the outer wall surface of the reformer 20 and the inner wall surface of the reformer accommodation chamber 42. In the reformer accommodation chamber 42, the combustion exhaust gas flows through the space formed between the outer wall surface of the reformer 20 and the inner wall surface of the reformer accommodation chamber 42. As a result, since heat exchange occurs between the reformer 20 and the combustion exhaust gas through outer wall surfaces (the outer bottom surface 20*a*, the outer peripheral surface 20*b*, and the outer upper surface 20*c*) of the reformer 20 excluding the surface of the common wall 40 in FIG. 3, the reformer 20 is heated efficiently.

The combustion exhaust gas which flowed through the reformer accommodation chamber 42 flows into the evaporator accommodation chamber 34 through the accommodation chamber connection port 44*b* of the compartment wall 44. As shown in FIG. 3, in the evaporator accommodation chamber 34, the combustion exhaust gas flows between the first outer peripheral wall 30*b* of the first chamber 30 and the evaporator 18, and through the space 36 between the first bottom wall 30*c* of the first chamber 30 and the inner bottom surface of the auxiliary device case 28. As a result, the temperature of the exhaust gas combustion chamber 26 is maintained by heat exchange between the combustion exhaust gas and the first wall 30*a*. Further, the evaporator 18 is heated by heat exchange with the combustion exhaust gas, and as a result, as described above, the raw fuel is heated and the water vapor is produced inside the evaporator 18.

After the combustion exhaust gas flowed through the evaporator accommodation chamber 34, the combustion exhaust gas flows from the combustion exhaust gas outlet 94 provided in the bottom wall 28*a* of the auxiliary device case 28 through the combustion exhaust gas pipe 96, and is supplied to the heat exchanger 16 in FIG. 1. The combustion exhaust gas which has been subjected to heat exchange with the oxygen-containing gas in the heat exchanger 16 to heat the oxygen-containing gas is then supplied to, e.g., a condenser (not shown), and after the water content contained in the combustion exhaust gas is collected, the combustion exhaust gas is discharged to the outside of the fuel cell module 10.

In this regard, as described above, the combustion exhaust gas is produced by suitably inducing combustion reaction of the oxygen-containing exhaust gas and the fuel exhaust gas, and the content of the unconsumed fuel gas (fuel exhaust gas) is sufficiently small. Therefore, it is possible to easily suppress discharge of the unconsumed fuel gas together with the combustion exhaust gas.

As can be seen from the above, in the fuel cell module 10 according to the embodiment of the present invention, the evaporator 18 and the reformer 20 are provided adjacent to each other, and the exhaust gas combustion chamber 26 is formed to face both of the evaporator 18 and the reformer 20. Specifically, the exhaust gas combustion chamber 26 includes the first chamber 30 facing the evaporator 18 with clearance, and the second chamber 32 having the common wall 40 shared with the reformer 20. Therefore, for example, it is possible to effectively utilize the space in the fuel cell module 10 to form the exhaust gas combustion chamber 26 having a larger volume than in the case where the exhaust gas combustion chamber 26 is formed in a manner to face only the reformer 20.

As described above, since it is possible to increase the volume of the exhaust gas combustion chamber 26, it is possible to suppress occurrence of the situation where the fuel exhaust gas and the oxygen-containing exhaust gas are discharged from the exhaust gas combustion chamber 26 before terminating combustion reaction. That is, it is possible to provide a long route where the fuel exhaust gas and the oxygen-containing exhaust gas flow through the exhaust gas combustion chamber 26 while being combusted, and are discharged from the combustion chamber outlet 38. Further, in the exhaust gas combustion chamber 26, it is possible to suppress occurrence of the situation where the rapid change which may inhibit combustion reaction occurs, in the direction in which the fuel exhaust gas and the oxygen-containing exhaust gas flow. As a result, it is possible to cause the combustion reaction of the fuel exhaust gas and the oxygen-containing exhaust gas to proceed sufficiently and suitably.

Further, since the evaporator 18 which is operated at a lower temperature (e.g., 100° C. to 200° C.) than the temperature of the reformer 20, etc. and the outer wall surface of the first chamber 30 of the exhaust gas combustion chamber 26 are disposed spaced from each other, even in the case of adopting the structure where the first chamber 30 faces the evaporator 18 as described above, it is possible to suppress cooling of the walls of the exhaust gas combustion chamber 26 by the evaporator 18. Further, in the exhaust gas combustion chamber 26, the wall of the second chamber 32 has the common wall 40, and the heat of the reformer 20 operated at high temperature is directly transmitted to the common wall 40. As a result, it is possible to maintain the walls of the exhaust gas combustion chamber 26 at high temperature. Therefore, even if the fuel exhaust gas and the oxygen-containing exhaust gas that are being consumed in the combustion reaction in the exhaust gas combustion chamber 26 contact the walls of the exhaust gas combustion chamber 26, it is possible to suppress inhibition of the progress of the combustion reaction.

Accordingly, in this fuel cell module 10, it is possible to suitably combust the fuel exhaust gas and the oxygen-containing exhaust gas inside the exhaust gas combustion chamber 26. Therefore, even if the quantity of the unconsumed fuel gas discharged as the fuel exhaust gas is decreased by, for example, changing of the proportion of the usage quantity relative to the supply quantity of the fuel gas in the fuel cell 24 (fuel utilization ratio), it is possible to effectively obtain the heat energy by suitably combusting the fuel exhaust gas and the oxygen-containing exhaust gas inside the exhaust gas combustion chamber 26. Moreover, it is possible to suitably heat the exhaust gas combustion chamber 26, the reformer 20, the evaporator 18, the heat exchanger 16, etc. by utilizing the heat energy produced in this combustion.

The fuel cell module 10 according to the embodiment described above further includes the auxiliary device case 28 including the evaporator accommodation chamber 34 configured to accommodate the first chamber 30 and the evaporator 18, the reformer accommodation chamber 42 configured to accommodate the second chamber 32 and the reformer 20, and the compartment wall 44 configured to separate the evaporator accommodation chamber 34 from the reformer accommodation chamber 42. The second chamber 32 is provided with the combustion chamber outlet 38, and the combustion chamber outlet 38 enables the combustion exhaust gas in the exhaust gas combustion chamber 26 to flow between the outer wall surface of the reformer 20 and the inner wall surface of the reformer accommodation chamber 42, the compartment wall 44 is provided with the accommodation chamber connection port 44b configured to enable the combustion exhaust gas, which has been subjected to heat exchange with the reformer 20 in the reformer accommodation chamber 42, to flow through the evaporator accommodation chamber 34, and the evaporator accommodation chamber 34 is provided with the combustion exhaust gas outlet 94 configured to discharge the combustion exhaust gas, which has been subjected to heat exchange with the first chamber 30 and the evaporator 18, from the evaporator accommodation chamber 34.

In this case, heat exchange between the hot combustion exhaust gas which flowed out of the combustion chamber outlet 38 and the reformer 20 can be performed. That is, in the fuel cell module 10, it is possible to transmit the heat of the exhaust gas combustion chamber 26 to the reformer 20 through the common wall 40, and heat the reformer 20 by the heat of the combustion exhaust gas. Therefore, it is possible to effectively utilize the heat energy produced by combusting the fuel exhaust gas and the oxygen-containing exhaust gas, to heat the reformer 20. As a result, for example, it is possible to reduce the time required for starting operation of the reformer 20, and cause the steam reforming reaction in the reformer 20 to suitably proceed to obtain the fuel gas.

Further, the combustion exhaust gas, which has been subjected to heat exchange with the reformer 20 in the reformer accommodation chamber 42, is allowed to flow to the evaporator accommodation chamber 34 through the accommodation chamber connection port 44b. Therefore, it is possible to heat the evaporator 18 by the combustion exhaust gas in the evaporator accommodation chamber 34, and heat the first chamber 30 of the exhaust gas combustion chamber 26. In this manner, it becomes possible to evaporate the water in the evaporator 18 and maintain the walls of the exhaust gas combustion chamber 26 at high temperature by utilizing the heat energy produced in combustion of the fuel exhaust gas and the oxygen-containing exhaust gas.

In the fuel cell module 10 according to the embodiment described above, the evaporator accommodation chamber 34 is provided at the bottom of the auxiliary device case 28, and the space 36 is formed between the first bottom wall 30c (outer bottom surface) of the first chamber 30 and the inner bottom surface of the evaporator accommodation chamber 34. In this case, the space 36 between the auxiliary device case 28 and the exhaust gas combustion chamber 26 functions as a heat insulating layer. Therefore, it is possible to suppress occurrence of the situation where the heat of the walls of the exhaust gas combustion chamber 26 is removed to the outside through the auxiliary device case 28. That is, it is possible to suitably maintain the walls of the exhaust gas combustion chamber 26 at high temperature. Moreover, it becomes possible to suitably combust the fuel exhaust gas and the oxygen-containing exhaust gas inside the exhaust gas combustion chamber 26 to obtain the heat energy.

In the fuel cell module 10 according to the embodiment described above, the combustion exhaust gas can flow through the space 36 formed between the first bottom wall 30c (outer bottom surface) of the first chamber 30 and the inner bottom surface of the evaporator accommodation chamber 34. In this case, since heat exchange between the first bottom wall 30c of the first chamber 30 and the combustion exhaust gas can be performed, it becomes possible to maintain the walls (the first wall 30a, the second wall 32a, the third wall 33a) of the exhaust gas combustion chamber 26 at high temperature more effectively. Moreover, it becomes possible to suitably combust the fuel exhaust gas and the oxygen-containing exhaust gas inside the exhaust gas combustion chamber 26 to obtain the heat energy.

In the fuel cell module 10 according to the embodiment described above, as viewed in a direction in which the first chamber 30 and the second chamber 32 are arranged, the reformer 20 has a frame shape extending in a direction to surround outer periphery of the second chamber 32, both ends of the reformer 20 in a direction in which the reformer 20 extends are spaced from each other, and the combustion chamber outlet 38 is provided between the both ends. The entire peripheral wall forming the second chamber 32 and the entire inner peripheral wall of the reformer 20 form the common wall 40. In this case, since the entire periphery wall forming the second chamber 32 and the entire inner peripheral wall of the reformer 20 form the common wall 40, it is possible to effectively transmit the heat of the reformer 20 to the exhaust gas combustion chamber 26, and effectively transmit the heat of the exhaust gas combustion chamber 26 to the reformer 20. As a result, it becomes possible to suitably maintain the walls of the exhaust gas combustion chamber 26 at high temperature, and heat the reformer 20 by effectively utilizing the heat energy produced in combustion of the fuel exhaust gas and the oxygen-containing exhaust gas.

In the fuel cell module 10 according to the embodiment described above, the space, through which the combustion exhaust gas can flow, is formed between the outer wall surface of the reformer 20 excluding the surface of the common wall 40, and the inner wall surface of the reformer accommodation chamber 42. In this case, since heat exchange between the combustion exhaust gas and the reformer 20 can be performed effectively in the reformer accommodation chamber 42, it becomes possible to more suitably heat the reformer 20 utilizing the heat energy produced in combustion of the combustion exhaust gas.

In the fuel cell module 10 according to the embodiment described above, the exhaust gas combustion chamber 26 is provided with the guide wall 54 extending in the direction in which the first chamber 30 and the second chamber 32 are arranged. The guide wall 54 is configured to guide the combustion exhaust gas to flow from the second chamber 32 to the inside of the first chamber 30, and then guide the combustion exhaust gas to the combustion chamber outlet 38 of the second chamber 32. In this case, it is possible to provide a long route where the fuel exhaust gas and the oxygen-containing exhaust gas flow through the exhaust gas combustion chamber 26 while being combusted, and are discharged from the combustion chamber outlet 38, by the guide wall 54 by effectively utilizing the space of the exhaust gas combustion chamber 26. Accordingly, it is possible to cause the combustion reaction of the fuel exhaust gas and the oxygen-containing exhaust gas to proceed sufficiently to suitably obtain the heat energy.

The fuel cell module 10 according to the embodiment described above further includes the heat exchanger 16 configured to perform heat exchange between the combustion exhaust gas discharged from the combustion exhaust gas outlet 94 of the evaporator accommodation chamber 34 and the oxygen-containing gas before being supplied to the fuel cell 24. In this case, it is possible to effectively utilize the heat energy of the combustion exhaust gas to preheat the oxygen-containing gas before being supplied to the fuel cell 24, and suitably induce the electrochemical reactions in the fuel cell 24.

In the fuel cell module 10 according to the embodiment described above, the exhaust gas combustion chamber 26 further includes the third chamber 33 connected to the second chamber 32 on the side opposite to the first chamber 30. The combustor 22, the oxygen-containing exhaust gas channel 50 for supplying the oxygen-containing exhaust gas to the combustor 22, and the fuel exhaust gas channel 52 for supplying the fuel exhaust gas to the combustor 22 are provided inside the third chamber 33.

In this case, the exhaust gas combustion chamber 26 includes the third chamber 33 in which the oxygen-containing exhaust gas channel 50 and the fuel exhaust gas channel 52 are provided. Accordingly, it is possible to effectively utilize the space in the fuel cell module 10 to increase the volume of the exhaust gas combustion chamber 26. Therefore, it is possible to suitably combust the fuel exhaust gas and the oxygen-containing exhaust gas. Further, since the fuel exhaust gas and the oxygen-containing exhaust gas heated in the third chamber 33 can be supplied to the combustor 22, also in this case, it becomes possible to more suitably combust the fuel exhaust gas and the oxygen-containing exhaust gas. It should be noted that the exhaust gas combustion chamber 26 may not include the third chamber 33, and the second chamber 32 may be provided with the combustor 22.

In the exhaust gas combustion chamber 26 of the fuel cell module 10 according to the embodiment described above, the second chamber 32 is provided above the first chamber 30, and the third chamber 33 is provided above the second chamber 32, and the combustor 22 produces the combustion exhaust gas by combusting the fuel exhaust gas and the oxygen-containing exhaust gas while causing the fuel exhaust gas and the oxygen-containing gas to flow from the third chamber 33 to the first chamber 30.

In this case, the fuel exhaust gas and the oxygen-containing exhaust gas flow from the third chamber 33 to the second chamber 32 and the first chamber 30 while being combusted, and are discharged from the combustion chamber outlet 38. Accordingly, it is possible to provide a long route where the fuel exhaust gas and the oxygen-containing exhaust gas flow while being combusted. Therefore, it becomes possible to cause the combustion reaction of the fuel exhaust gas and the oxygen-containing exhaust gas to suitably proceed to suitably obtain the heat energy.

The present invention is not limited to the above-described embodiment. Various modifications may be made without departing from the gist of the present invention.

What is claimed is:

1. A fuel cell module comprising:
a fuel cell configured to perform power generation consuming a fuel gas and an oxygen containing gas supplied to the fuel cell, and to discharge a fuel exhaust gas and an oxygen-containing exhaust gas;
a reformer configured to reform a raw fuel chiefly containing hydrocarbon using water vapor, and to produce the fuel gas supplied to the fuel cell;
an evaporator configured to evaporate water to produce the water vapor supplied to the reformer;
a combustor configured to combust the fuel exhaust gas and the oxygen-containing exhaust gas inside an exhaust gas combustion chamber to produce a combustion exhaust gas; and
an auxiliary device case configured to accommodate the reformer, the evaporator and the combustor,
wherein the exhaust gas combustion chamber comprises:
a nozzle that is positioned on a side of the exhaust gas combustion chamber and that is configured to inject the oxygen-containing exhaust gas and the fuel exhaust gas;
a second chamber that is positioned below the nozzle;
a first chamber that is positioned below the second chamber and connected to the second chamber; and
a combustion chamber outlet that is located downstream of the first chamber and that is configured to discharge from a side of the second chamber the combustion exhaust gas in the exhaust gas combustion chamber; and
a guide wall that is configured to separate the first chamber and the second chamber from each other and that is configured to guide the combustion exhaust gas in the first chamber to the combustion chamber outlet, and
wherein the auxiliary device case includes:
a reformer accommodation chamber that is configured to accommodate the second chamber and the reformer and that includes the combustion chamber outlet;
an evaporator accommodation chamber that is positioned below the reformer accommodation chamber and that is configured to accommodate the first chamber and the evaporator;
a compartment wall that is configured to separate the reformer accommodation chamber from the evaporator accommodation chamber;
an accommodation chamber connection port that is provided for the compartment wall and connects the reformer accommodation chamber and the evaporator accommodation chamber to guide the combustion exhaust gas which has been subjected to heat exchange with the reformer in the reformer accommodation chamber, to the evaporator accommodation chamber; and
a combustion exhaust gas outlet that is provided for the evaporator accommodation chamber to discharge the combustion exhaust gas which has been subjected to heat exchange with the evaporator, from the evaporator accommodation chamber,
wherein the reformer surrounds a periphery of the second chamber in a horizontal direction and shares a common wall with the second chamber, and
wherein the evaporator is provided below and adjacent to the reformer and surrounds a periphery of the first chamber in the horizontal direction, and at least part of an outer wall surface of the evaporator is separated from a wall surface of the first chamber.

2. The fuel cell module according to claim 1,
wherein the second chamber is provided with the combustion chamber outlet, and the combustion chamber outlet enables the combustion exhaust gas in the exhaust gas combustion chamber to flow between an outer wall surface of the reformer and an inner wall surface of the reformer accommodation chamber.

3. The fuel cell module according to claim 2, wherein the evaporator accommodation chamber is provided at a bottom of the auxiliary device case, and
a space is formed between an outer bottom surface of the first chamber and an inner bottom surface of the evaporator accommodation chamber.

4. The fuel cell module according to claim 3, wherein the combustion exhaust gas is allowed to flow through the space formed between the outer bottom surface of the first chamber and the inner bottom surface of the evaporator accommodation chamber.

5. The fuel cell module according to claim 2, wherein
as viewed in a direction in which the first chamber and the second chamber are arranged, the reformer has a frame shape extending in a direction to surround an outer periphery of the second chamber,
both ends of the reformer in a direction in which the reformer extends are spaced from each other,
the combustion chamber outlet is provided between the both ends, and
an entire peripheral wall forming the second chamber and an entire inner peripheral wall of the reformer form the common wall.

6. The fuel cell module according to claim 2, wherein a space, through which the combustion exhaust gas is allowed to flow, is formed between the outer wall surface of the reformer excluding a surface of the common wall and the inner wall surface of the reformer accommodation chamber.

7. The fuel cell module according to claim 2, wherein
the exhaust gas combustion chamber is provided with a guide wall extending in a direction in which the first chamber and the second chamber are arranged, and
the guide wall is configured to guide the combustion exhaust gas to flow from the second chamber to an inside of the first chamber, and then to guide the combustion exhaust gas to the combustion chamber outlet of the second chamber.

8. The fuel cell module according to claim 2, further comprising:
a heat exchanger configured to perform heat exchange between the combustion exhaust gas discharged from the combustion exhaust gas outlet of the evaporator accommodation chamber and the oxygen-containing gas before being supplied to the fuel cell.

9. The fuel cell module according to claim 1, wherein
the exhaust gas combustion chamber further includes a third chamber connected to the second chamber on a side opposite to the first chamber, and
the combustor, an oxygen-containing exhaust gas channel configured to supply the oxygen-containing exhaust gas to the combustor, and a fuel exhaust gas channel configured to supply the fuel exhaust gas to the combustor are provided inside the third chamber.

10. The fuel cell module according to claim 9, wherein
in the exhaust gas combustion chamber, the second chamber is provided above the first chamber, and the third chamber is provided above the second chamber, and
the combustion chamber produces the combustion exhaust gas by combusting the fuel exhaust gas and the oxygen-containing exhaust gas while causing the fuel exhaust gas and the oxygen-containing gas to flow from the third chamber to the first chamber.

* * * * *